United States Patent [19]

Brasz et al.

[11] 4,388,262
[45] Jun. 14, 1983

[54] METHOD FOR THE FORMING OF PLASTICS

[75] Inventors: Albert J. H. Brasz, Born, Netherlands; Hermanus A. Wallink, Selfkant, Fed. Rep. of Germany

[73] Assignee: Stamicarbon, B.V., Geleen, Netherlands

[21] Appl. No.: 236,046

[22] Filed: Feb. 20, 1981

[30] Foreign Application Priority Data

Feb. 21, 1980 [NL] Netherlands .......................... 8001053

[51] Int. Cl.³ .......................... B29B 1/06; B29B 3/02
[52] U.S. Cl. .................. 264/176 R; 264/349; 366/78; 366/81; 366/90; 425/208; 425/379 R
[58] Field of Search ............... 264/176 R, 68, 349, 264/40.6; 425/379 R, 208; 366/81, 79, 78, 90

[56] References Cited

U.S. PATENT DOCUMENTS

| | | | |
|---|---|---|---|
| 2,653,915 | 9/1953 | Elgin et al. | 264/68 |
| 3,584,340 | 6/1971 | Koch | 425/207 |
| 3,728,053 | 4/1973 | Stillhard et al. | 425/208 |
| 3,788,612 | 1/1974 | Dray | 425/208 |
| 3,878,285 | 4/1975 | Souffie | 264/68 |
| 3,957,256 | 5/1976 | Murakami | 366/81 |
| 3,989,434 | 11/1976 | Mercer | 425/207 |
| 4,106,113 | 8/1978 | Laimer et al. | 425/207 |
| 4,134,688 | 1/1979 | Horie et al. | 264/68 |
| 4,218,146 | 8/1980 | Housz | 366/78 |

FOREIGN PATENT DOCUMENTS

| | | | |
|---|---|---|---|
| 2558238 | 7/1977 | Fed. Rep. of Germany | 425/208 |
| 2558638 | 7/1977 | Fed. Rep. of Germany | 425/208 |
| 7702020 | 8/1978 | Netherlands . | |

*Primary Examiner*—Jeffery R. Thurlow

[57] ABSTRACT

Method for the forming of thermoplastic and/or elastomeric resins, in which method use is made of a melt torpedo in the melting zone of a processing machine having a screw. The torpedo has grooves and ridges with a helix angle of preferably between 55° and 75°. The final melt temperature, that is the temperature at the beginning of the outlet of the processing machine is chosen lower than that applied in the same processing machine without a torpedo.

31 Claims, 4 Drawing Figures

METHOD FOR THE FORMING OF PLASTICS

BACKGROUND AND SUMMARY OF THE INVENTION

The invention relates to a method for the forming of thermoplastic and/or elastomeric resins with the use of a plastics processing machine provided with a screw.

In, for instance, a screw extruder the mass to be extruded is passed from a feed hopper via a conveying, melting and homogenization zone to the outlet opening. The shape of the outlet opening determines the profile into which the mass is formed. The melting of the mass takes place mainly in the melting zone. In the melting zone the mass is raised to a temperature above its melting point owing to the supply of heat through the wall and owing to the generation of heat in the mass in consequence of the work performed by the screw on the mass. In the melting zone the geometry of the screw is often such as to promote the generation of heat in the mass. After having left the melting zone, the mass is in a virtually completely molten condition, but internally it still shows great temperature differences. There are also great differences in the degree of distribution and possible reduction in size of additives through the polymer matrix. These differences in temperature, mixture and dispersion must be eliminated in the homogenization zone by means of a mixing and/or kneading effect of the screw on the mass, because the result of an inhomogeneous melt is that products of inferior quality are obtained.

The temperature curve of the mass in the extruder is such that, from the feed hopper onwards, there will be a rise, with a peak temperature in the melting zone or just after the melting zone if a dispersion section has been provided for, upon which there will usually be a fall towards the outlet opening through which the mass, still with a high temperature, leaves the extruder. The temperature at the beginning of the outlet opening is referred to as the final melt temperature. After the mass has left the machine, its temperature must be lowered by cooling to the ambient temperature or to a temperature suitable for a following process operation. Such a process operation may involve the blowing of film or the moleculair orientation of the polymer molecules as occurs in the monoaxial or biaxial stretching of the flat or tubular film and in the manufacture of bottles.

The high temperatures occurring in the extruder are noxious for the quality of the thermally sensitive plastics used. The necessary cooling of the extruded mass is not only expensive from an energy point of view, but in cases such as film blowing it may be highly limiting on the rate of production.

The invention provides a method for the forming of thermoplastic and/of elastomeric resins with the use of a plastics processing machine provided with a screw, which method eliminates the disadvantages mentioned to a major extent.

A device for the melting of plastics has become known from U.S. Pat. No. 4,218,146 with which, according to that application, a higher output of melt per unit of time can be obtained. This device, which can be used in both an extruder and the extruder section of an injection moulding machine, consists of a substantially cylinder-shaped body on which longitudinal grooves and ridges alternate, showing such a geometry that they form supply channels for the material to be melted and discharge channels for the melt. The grooves and ridges need not be truly longitudinal, so at an angle of 90°, but may be at a helix angle of 45°–90°, preferably between 55° and 75°. The length of the cylinder-shaped body is, for instance, 1–20 D, preferably 3–15 D, specifically 8–12 D, where D stands for the diameter of the screw.

According to the invention, it has now surprisingly been found that, using the device described above, hereinafter referred to as melt torpedo, at the head of a plastics processing machine, incorporating the torpedo in its melting zone, final melt temperatures can be set which are tens of degrees lower than those applied in comparable circumstances in known plastics processing machines to reach certain quality specifications. Using the lower final melt temperature, properties could be achieved ranging from equivalent to improved at higher yields than were possible on the known machines under otherwise equal circumstances.

The invention is characterized in that the screw is provided, in the melting zone of the plastics processing machine, with a melt torpedo as formulated above, and in that a final melt temperature is chosen which is lower than that applied under otherwise equal cicumstances to reach the same quality specifications of the end product.

Figure 1:
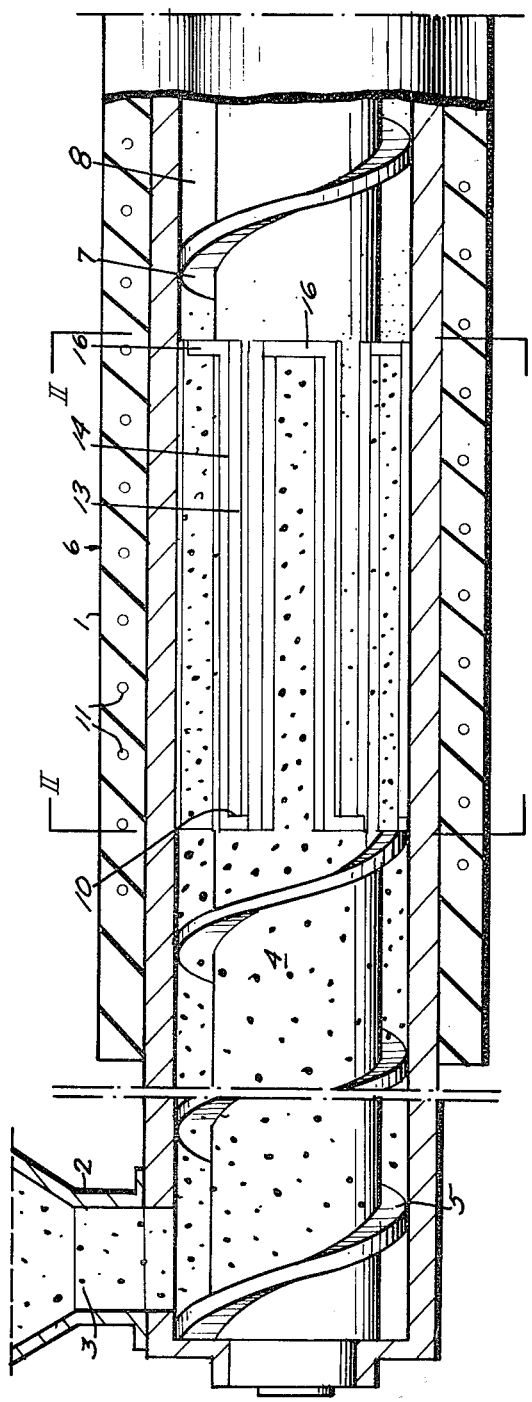
FIG. 1 is a diagram of a longitudinal section of an extruder with a single-thread screw pump which uses a melting section.
Figure 3:
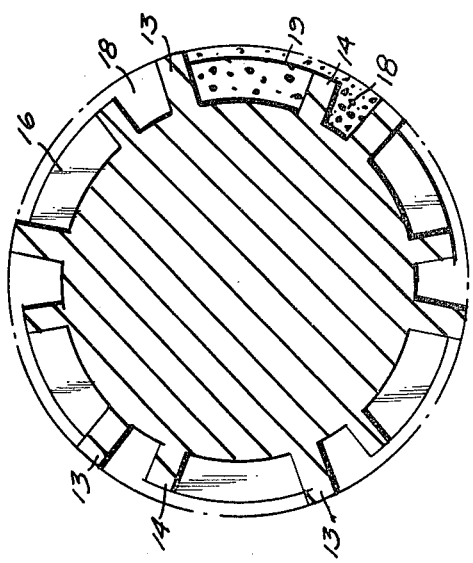
FIG. 3 shows a cross section along the line III—III in FIG. 2.
Figure 2:
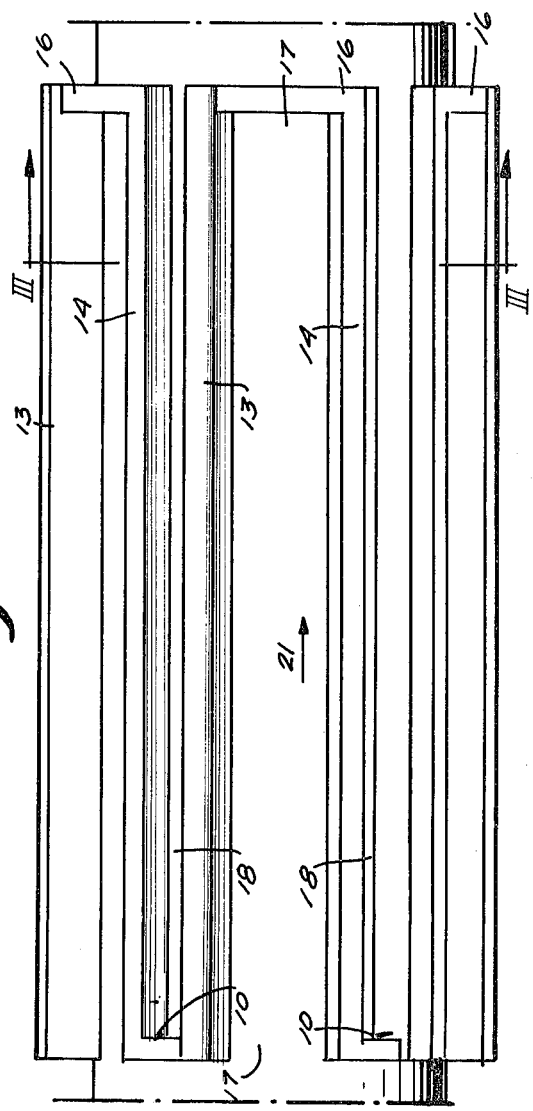
FIG. 2 represents on an enlarged scale the parts lying within the area indicated by lines II in FIG. 1.
Figure 4:
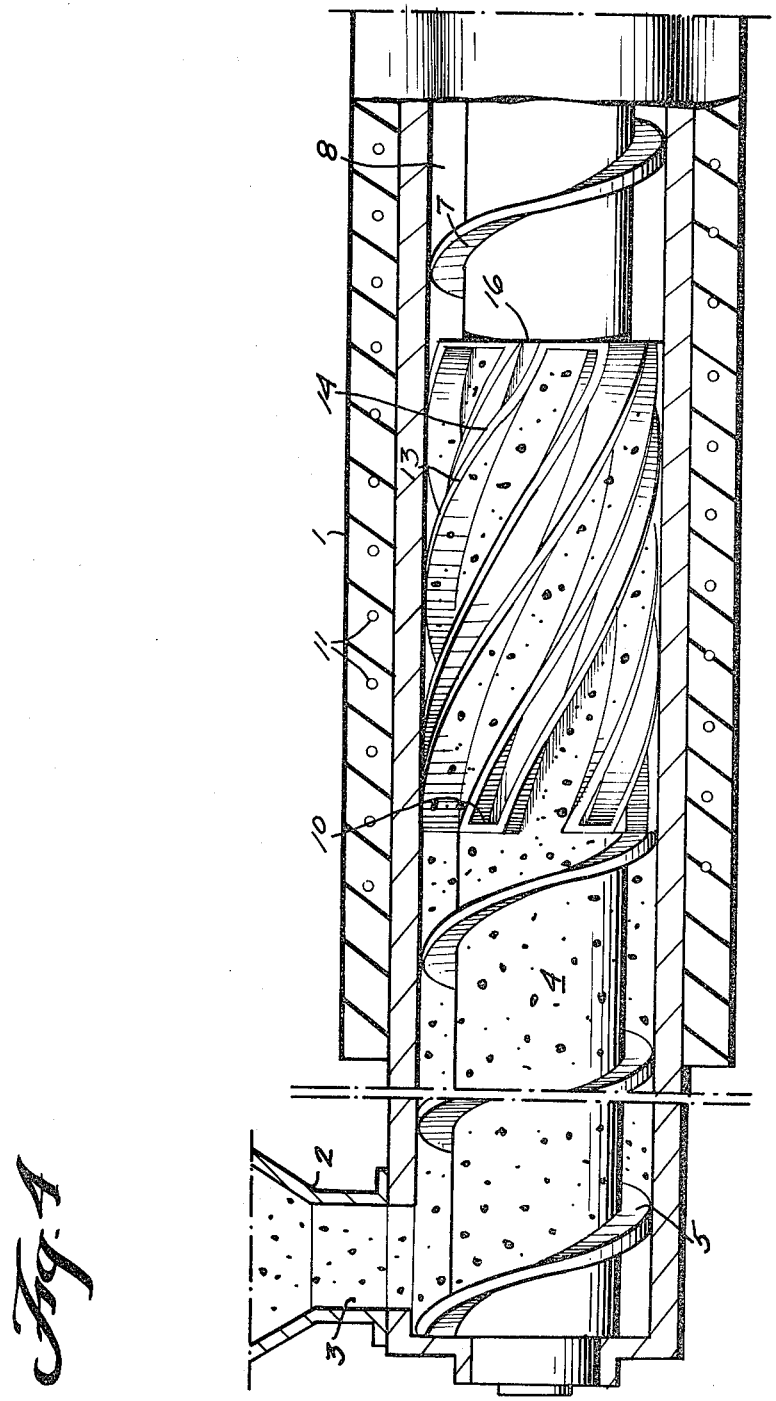
FIG. 4 is a diagram of an extruder having a helical arrangement as compared to the longitudinal arrangement of FIG. 1.

The melt torpedo can also be provided with grooves and ridges with a helix angle of 45°–90°, preferably between 55° and 75° (see FIG. 4).

The length of the melt torpedo may be between, for instance, 3 D and 15 D, preferably between 8 D and 12 D.

In applying the method according to the invention, for instance low-density polyethylene, high-density polyethylene, polypropylene, ethylene-propylene terpolymers, polyvinyl chloride, polystyrene, polyacrylonitrile-butadiene-styrene, polyesters such as polyethylene terephthalate and polybutene terephthalate, and the nylons as well as copolymers and mixtures of the polymers mentioned can be excellently processed above their melting points.

The melting points of the (part) crystalline plastics are determined by means of the peak melt temperatures by a DSC method, while the melting points of the amorphouse plastics, such as polyvinyl chloride, polystyrene and polyacrylonitrile- butadiene-styrene, are taken to be the glass transition point determined according to ISO R 537 method A.

Low-density polyethylene can be processed at a final melt temperature of between 105° C. and 180° C., preferably between 115° C. and 160° C. For high-density polyethylene these figures are between 120° C. and 200° C., preferably between 130° C. and 170° C., for polypropylene between 160° C. and 220° C., preferable between 170° C. and 200° C., for polyvinyl chloride between 140° C. and 210° C., preferably between 140° C. and 180° C., for polystyrene between 130° C. and 220° C., preferably between 140° C. and 200° C., for polyacrylonitrile-butadiene-styrene from the melting point to 130° C. above the melting point, preferably between 10° C. above the melting point and 100° C. above the melting point, for polyethylene terephthalate from the melting point to 30° C. above the melting point, preferably from the melting point to 20° C. above the melting point, for polybutene terephthalate between the melting point and 40° C. above the melting point, preferably between the melting point and 30° C. above the melting point, for nylon-6 between the melting and 70° C. above the melting point, preferably between the melting point and 40° C. above the melting point, for nylon-6,6 between the melting point and 40° C. above the melting point, preferably between the melting point and 30° C. above the melting point, for nylon-4 between the melting point and 10° C. above the melting point, preferably between the melting point and 5° C. above the melting point, for nylon-4,6 between the melting point and 30° C. above the melting point, preferably between the melting point and 15° C. above the melting point.

The invention will be elucidated by means of a few examples. In these examples an extrusion process for film blowing has been started from, because with such process the merits of the present invention can be expressed in the most significant manner, without any intention of restricting the invention to film blowing. The fact is that, in addition to film blowing, the invention also offers advantages in, for instance, the manufacture of flat film, sheets and profiles, the sheathing of cables and the blow-moulding of bottles.

EXAMPLE 1

For the blowing of a film from low-density polyethylene an extruder was used. The particulars of this extruder were:

Screw diameter: 60 mm
Compression ratio: 3 to 1
Blow-up ratio of the bubble: 3.5
Diameter of the extruder opening: 100 mm
Slot width: 0.9 mm The screw of the machine was provided with a conveying, a melting, a dispersion and a homogenization zone. The quantity of cooling air for the cooling of the extrudate was 9.4 m³/min. The temperature of the cooling air was about 26° C.

With this facility, which was set at a final melt temperature of 220° C., a yield of 44 kg of film (thickness 130 μm) per hour could be obtained. By lowering the final melt temperature to 190° C. a maximum of 51 kg of film per hour could be obtained. An even lower final melt temperature could not be reached with this extruder screw while maintaining a production of about 50 kg/hour. If yet a lower final melt temperature was chosen, no film could be blown any more on account of the poor extrudate, while the yield showed a drastic fall to about 5 kg/hour.

By incorporating a melt torpedo in this machine and by setting the final melt temperature at 160° C., while applying the same quantity of cooling air with the same temperature, a film yield of 59 kg/hour could be realized. The film quality obtained was equivalent to that of the machine without a melt torpedo.

This example shows the advantage of the method in case the cooling air facility has reached its maximum quantity of cooling air, in other words, is limiting on the rate of production.

EXAMPLE 2

The quantity of cooling air may also otherwise be limiting on the rate of production. This is the case when no more air can be allowed on the bubble on account of the loss of bubble stability, though the cooling air facility has not yet reached its maximum supply capacity. The bubble can then, for instances, be blown to pieces.

With the facility of example 1, in which no melt torpedo had been incorporated, and with a final melt temperature set at 200° C., the quantity of air proved limiting on account of bubble instability at a yield of 52 kg film per hour.

With the same machine, with melt torpedo, bubble instability was found to occur, after lowering of the final melt temperature to 170° C., only with a film output of 74 kg/hour and, after lowering to 150° C., only with 90 kg/hour. Again film qualities were obtained equivalent to those of the machine without melt torpedo.

EXAMPLE 3

A. The machine of example 1 without melt torpedo was set at a final melt temperature of 190° C. and a film yield of 55 kg/hour.

B. According to the invention the machine of example 1 was provided with a melt torpedo. The final melt temperature was set at 150° C. and the film yield at 55 kg/hour.

In the following table the film properties of the methods described under A and B have been given.

TABLE

|  | A | B |
|---|---|---|
| Energy of fall, kJ/m | 33 | 35 |
| Elmendorf tearing strength ( ∥ , ⊥), kN/m | 40/59 | 45/49 |
| Tensil tester tearing strength ( ∥ , ⊥), kN/M | 65/73 | 68/75 |

Considering these figures, it may be noted that, with an increase in yield according to method A, the qualities deteriorate, whereas those according to method B continue to be the same.

We claim:

1. A method of forming thermoplastic and/or elastomeric materials utilizing a plastics processing machine of the type including a chamber having a predetermined diameter D, material supply means in communication with said chamber for supplying material to said chamber, means defining a material exit, and screw means operatively associated with said chamber for conveying said material from said material supply means to said exit means, said chamber defining a feed zone, a material heating zone downstream of said feed zone, and a homogenization zone downstream of said feed zone, wherein said screw means includes a melt torpedo disposed in said material heating zone having a plurality of alternating grooves and ridges thereby defining therebetween a plurality of alternating inlet and discharge channels for melting the material and discharging the melted material, respectively, said method comprising:
   (a) supplying solid material to the chamber;
   (b) melting the material in the material melting zone above its melting point to a predetermined peak temperature; and
   (c) allowing the material melted according to step (b) to cool in the homogenization zone to a substantially lower final melt temperature below the peak temperature prior to exiting the chamber via said material exit means so that at least comparable amounts of material can be processed per unit time at a lower final melt temperature than conventionally associated with the material.

2. Method according to claim 1, wherein the melt torpedo includes grooves and ridges having a helix angle between 45°–90°.

3. Method according to claim 2 wherein the helix angle is between 55° to 75°.

4. Method according to claim 1 or 2 wherein the length of the melt torpedo is between 3D and 15D.

5. Method according to claim 4 wherein the length of the melt torpedo is between 8D and 12D.

6. Method according claim 1 wherein the plastics processing machine is an extruder.

7. Method according to claim 1 wherein plastic film is extruded.

8. Method according to claim 1 wherein the material is low-density polyethylene and wherein the final melt temperature is between 105° C. and 180° C.

9. Method according to claim 8 wherein the final melt temperature is between 115° C. and 160° C.

10. Method according to claim 1 wherein the material is high-density polyethylene and wherein the final melt temperature is between 120° C. and 200° C.

11. Method according to claim 10 wherein the final melt temperature is between 130° C. and 170° C.

12. Method according to claim 1 wherein the material is polypropylene and wherein the final melt temperature is between 160° C. and 220° C.

13. Method according to claim 12 wherein the final melt temperature is between 170° C. and 200° C.

14. Method according to claim 1 wherein the material is polyvinyl chloride and wherein the final melt temperature is between 140° and 210° C.

15. Method according to claim 14 wherein the final melt temperature is between 140° C. and 180° C.

16. Method according to claim 1 wherein the material is polyacrylonitrile-butadiene-styrene and wherein the final melt temperature is between the material melting point and 130° C. above the material melting point.

17. Method according to claim 16 wherein the final melt temperature is between 10° C. above the material melting point and 100° C. above the material melting point.

18. Method according to claim 1 wherein the material is polyethylene terephthalate and wherein the final melt temperature is between the material melting point and 30° C. above the material melting point.

19. Method according to claim 18 wherein the final melt temperature is between the material melting point and 20° C. above the material melting point.

20. Method according to claim 1 wherein the material is polybutene terephthalate is processed, and wherein the final melt temperature is between the material melting point and 40° C. above the material melting point.

21. Method according to claim 20 wherein the final melt temperature is between the material melting point and 30° C. above the material melting point.

22. Method according to claim 1 wherein the material is nylon-6 and wherein the final melt temperature is between the material melting point and 70° C. above the material melting point.

23. Method according to claim 22 wherein the final melt temperature is between the material melting point and 40° above the material melting point.

24. Method according to claim 1 wherein the material is nylon-6,6 and wherein the final melt temperature is between the material melting point and 40° above the material melting point.

25. Method according to claim 24 wherein the final melt temperature is between the material melting point and 30° C. above the material melting point.

26. Method according to claim 1 wherein the material is nylon-4 and wherein the final melt temperature is between the material melting point and 10° above the material melting point.

27. Method according to claim 26 wherein the final melt temperature is between the material melting point and 5° above the material melting point.

28. Method according to claim 1 wherein the material is nylon-4,6 and wherein the final melt temperature is between the material melting point and 30° C. above the material melting point.

29. Method according to claim 28 wherein the final melt temperature is between the material melting point and 15° C. above the material melting point.

30. Method according to claim 1 wherein the material is polystyrene and wherein the final melt temperature is between 130° C. and 220° C.

31. Method according to claim 30 wherein the final melt temperature is between 140° C. and 200° C.

* * * * *